United States Patent [19]
Brotzmann et al.

[11] Patent Number: 4,827,486
[45] Date of Patent: May 2, 1989

[54] PROCESS FOR INCREASING THE ENERGY INPUT IN ELECTRIC ARC FURNACES

[75] Inventors: Karl Brotzmann; Ernst Fritz, both of Sulzbach-Rosenberg, Fed. Rep. of Germany

[73] Assignee: Klöckner Cra Technologie GmbH, Duisburg, Fed. Rep. of Germany

[21] Appl. No.: 89,325

[22] Filed: Aug. 25, 1987

[30] Foreign Application Priority Data

Aug. 27, 1986 [DE] Fed. Rep. of Germany ....... 3629055

[51] Int. Cl.$^4$ .................... H05B 7/00; H05B 11/00
[52] U.S. Cl. ..................................................... 373/2
[58] Field of Search .................... 373/1, 2, 82, 85, 77, 373/60, 79; 266/265

[56] References Cited

U.S. PATENT DOCUMENTS

| | | | |
|---|---|---|---|
| 3,459,867 | 8/1969 | Estes | 373/2 |
| 3,905,589 | 9/1975 | Schempp et al. | 373/2 |
| 4,146,390 | 3/1979 | Widell | 373/82 |
| 4,646,315 | 2/1987 | Hixenbaugh et al. | 373/2 |

*Primary Examiner*—Roy N. Envall, Jr.
*Attorney, Agent, or Firm*—Toren, McGeady & Associates

[57] ABSTRACT

To save energy in the production of steel in an electric arc furnace while increasing the total input of energy, the employment of carbonaceous fuels and oxygen-containing gases is proposed. The oxygen or the oxygen-containing gases are led into the furnace in the upper part of the furnace through stationary top blow-in devices (4) into the space between the pitch circle of the electrodes (10) and the furnace wall (3). The resulting intense gas flow repeatedly sucks in the reaction gases arising from the scrap or the melt being formed and burns them. The heat thus set free is transferred to the scrap and/or the melt with a thermal efficiency of at least 70%. By nozzles (2) arranged below the surface of the bath, and preferably in the furnace floor, preferably oxidizing gases are led into the melt and solid materials, particularly carbonaceous fuels, are supplied to the melt through one or more hollow electrodes (6) with an abrasion-resistant cladding. With this process, increased energy input into the electric arc furnace becomes possible, and thus the melting down time can be shortened and the economy of the process improved.

16 Claims, 3 Drawing Sheets

PROCESS FOR INCREASING THE ENERGY INPUT IN ELECTRIC ARC FURNACES

TECHNICAL FIELD OF THE INVENTION

This invention relates to a process for increasing the energy input and saving electrical energy in electric arc furnaces for steel production in which carbonaceous fuels and oxygen or oxygen-containing gases, for example air, are blown into the furnace chamber or into the furnace chamber and the melt in addition to the electrical energy.

BACKGROUND OF THE INVENTION AND PRIOR ART

Developments in steel production in electric arc furnaces have been marked since the last oil crisis by measures for saving electrical energy and shortening the melting-down time. Thus for example, in Japan in the period from 1973 to 1983, the average duration of the tapping cycle has been reduced, for 146 electric furnaces, from 2 hours 46 minutes to 1 hour 51 minutes. The power used was reduced in the same period from 543 to 439 kWh per ton. Electrode consumption fell from 5.1 to 3.1 kg/t.

To speed up the melting down of scrap, oxygen is blown in through consumable pipes or lances on to the hot scrap in amounts of up to 25 $Nm^3/t$. The iron oxide formed is partly reduced after the melting down of the scrap by the addition of fairly small amounts of lump coke or by blowing in coal, also through consumable lances. However, there has still only been a small gain in heat with this conversion of the relatively small amounts of carbon into CO.

The melting down of scrap is also speeded up by the use of various types of burners, in particular oil-oxygen burners. These burners are usually arranged immediately above the melt in the upper part of the side walls of the furnace.

In the past there has been no lack of efforts to reduce the economically important consumption of graphite electrodes by means of electrodes without through-flow or of hollow electrodes fed with gas or gas-solid suspensions, and/or to produce other effects such as lowering the hydrogen content in the steel or the addition of solids generally. U.S. Pat. No. 2,909,422 and German Offenlegungsschrift 29 00 864 describe such processes. The reason why this technique of blowing in through hollow electrodes has not become established lies, inter alia, in the fact that the solids that are blown in are not completely distributed in the bath owing to the lack of movement of the bath. No economically worthwhile results could be obtained by blowing in fuels.

In other present-day variants of the process, the off-gases are collected and used to heat the scrap, outside the electric arc furnace, in special preheating chambers. The hot scrap is then charged into the electric arc furnace. With these known improvements the tapping cycle of the electric arc furnace can, in individual cases, be shortened to about 80 minutes.

OBJECT OF THE INVENTION

To provide a continuous supply to modern continuous casting plants and to lower the heat losses of the furnace, a further reduction in the duration of the tapping cycle in electric arc furnace operations is as important economically as reducing the consumption of expensive electrical energy in melting down scrap. Accordingly, the object of the invention is to improve the economics of steel production in the electric arc furnace and to provide a process that makes it possible to improve the melting performance of the furnace, to increase the heat input and thus also to shorten the tapping cycle, and, in particular to use, to a large extent, cheap fuels with high thermal efficiency to save electrical energy. In addition, the new process should operate reliably and not detract from the known advantages of the electric arc furnace, particularly, its high flexibility and reliable process control.

SUMMARY OF THE INVENTION

This object is achieved according to the invention in a process for increased supply and saving of energy in electric arc furnaces, wherein the oxygen is blown in in the form of free jets and that gases are introduced through nozzles arranged beneath the surface of the bath in the regions in which the blow-in jets impinge upon the melt.

According to the invention, oxygen and/or preheated air are introduced into the scrap or the gas space of an electric arc furnace at an angle of 30° to 60° downwardly from the horizontal and tangentially into the space between the pitch circle of the electrodes and the furnace wall through stationary top blowing devices arranged in the upper part of the furnace. The circulating reaction gases arising from the impurities in the scrap and above all, from the carbonaceous fuels supplied, such as coal or coke, are repeatedly sucked into the free jets from the top blowing devices and are thereby thoroughly burned. The heat set free by this combustion of the reaction gases is transferred to the scrap and/or the melt with a thermal efficiency of 70 to 90%, with at least locally intensified movement of the bath. The resulting increase in the temperature of the off-gases supplied to the off-gas purification above the temperature of the furnace space is insignificant. The consumption of oxygen and fuel to save electrical energy is only small, on account of the good heat transfer and the thorough combustion of the reaction gas to $CO_2$ and $H_2O$ and the combustion of hydrocarbon-containing contaminants, such as paint, oil, plastics, etc., supplied with the scrap.

According to the invention, the top blowing devices are preferably arranged in the upper part of the furnace wall, with the longitudinal axes of the top blowing devices directed downwards into the furnace chamber tangentially to an imaginary upright cylinder between the pitch circle of the electrodes and the furnace wall. The diameter of this imaginary upright cylinder is between 0.5 and 0.8 times the internal diameter of the furnace.

In the known manner of operating electric arc furnaces, the reaction gases arising from the scrap would flow out of the furnace with the off-gases without this energy being transferred, to any great extent, to the scrap or the melt. According to the invention, there is already an increased input of energy through the combustion of the impurities adhering to the scrap.

According to a further feature of the invention, the gas jets from the top blowing devices particularly heat the relatively colder parts of the furnace, the so-called "cold spots", and the scrap that is situated there, which further speeds up the melting down of the scrap.

For operation with oxygen, the individual inlet openings, i.e. the nozzles, of the top-blowing devices are designed according to the following formula:

$$D = 0.3 \text{ to } 0.9\sqrt{G/(Z \cdot n)}$$

wherein
D = nominal diameter of the nozzle (cm)
G = Weight of liquid steel (t/charge)
Z = Number of nozzles per top blowing device
n = Number of top blowing devices per furnace.

Basically, in carrying out the process according to the invention, any desired oxygen top blowing devices, from simple pipes to water-cooled lances, can be employed. According to the invention, however, oxygen top blowing devices with a plurality of outlet openings, also known as nozzles, have been found to be particularly good. These top blowing devices have no water cooling and can for example, be made of copper. They have one to six outlet openings, but preferably have four nozzles. The gas inlet pressure at the oxygen top blowing devices is adjusted so that the gas jets normally emerge at the velocity of sound. Nozzles with conically widened outlet openings can however, be used, which permit supercritical flow velocities.

It is within the scope of the invention to vary the blowing rates of the oxygen-containing gases at the top blowing devices during operation, for example, to control them in relation to the off-gas analysis and/or the fuel supply.

According to the invention, it is found particularly advantageous to operate the top blowing nozzles using reheated air at about 700° to 1300° C., particularly about 900° to 1200° C. Surprisingly, with increasing temperatures in the furnace chamber, the degree of afterburning, and thus the input of energy into the electric arc furnace process, can be increased by using hot air instead of oxygen. Through the use of hot air, the thermal efficiency, i.e. the transfer of the heat won from the afterburning back to the scrap and/or the melt, can also be increased With the operation of the top blowing devices and the simultaneous supply of carbonaceous fuel, the thermal efficiency of the recovery of the heat won from the after-burning of the reaction gases, falls as the melting-down time of the scrap increases. According to an important feature of the present invention, this reduction in energy input can be counteracted by intensification of the bath movement. In this respect, it has been found particularly advantageous, according to the invention, to supply the oxygen to the melt through nozzles arranged in the floor of the electric arc furnace in the regions where the hot top-blowing jets meet the surface of the melt. The introduction of oxygen can lead to CO being formed in the melt and being evolved at the points at which the thorough combustion to $CO_2$ and the heat recovery are at their best.

The amount of gas flowing through the nozzles below the bath surface can be varied. According to the invention, the amount of gas is decreased as the amount of the iron melt in the electric arc furnace is increased. When the whole of the scrap is molten, the oxygen blowing rate is about 2 $Nm^2$/min per nozzle or less.

The nozzles below the bath surface are normally operated with the usual oxygen over-pressure of 5 to 10 bar, at most 20 bar. It is however, within the scope of the invention to work with an increased pressure of up to 60 bar.

According to the invention, carbonaceous fuels are blown into the melt through one or more hollow electrodes, and the nozzles operated with oxygen below the bath surface contribute to the distribution of the carbon and the partial combustion to CO in the melt. According to a further feature of the invention, very large amounts of fuel can be supplied to the melt in this way per unit time and per electrode and correspondingly reacted.

The supply of oxidizing gases or inert gas, and of liquids, e.g. oil, through the known nozzles comprising two concentric tubes, presented problems with known techniques. For example, problems arose from sprays through nozzles built into the floor or the lower side wall, which led to the formation of large accretions of steel in the upper part of the side wall of the furnace. A satisfactory solution is only obtained by a clear reduction in the amounts of gas introduced, adapting the nozzle inlet pressure to the condition of the melt, optimization of the position of the nozzles and further reduction of the amounts of gas to a minimum when the scrap is thoroughly molten. According to the invention, nozzles with a nominal diameter of 3 to 8 mm are employed. Preferably double tube nozzles are used, oxygen being passed through the central tube and gaseous hydrocarbons and/or inert gas or mixtures thereof being passed through the annular gap. Oil, for example light heating oil, can also be used to protect the nozzles.

It is within the scope of the invention to close the inner tube of the nozzles, for example by stopping it up with a refractory material, and only introduce gases into the melt through the annular gap. These may, for example, be inert gas, nitrogen, aqueous hydrocarbons such as natural gas, butane or propane, CO, $CO_2$ or any desired mixtures thereof. The supply of liquids, for example oil, through the annular gap is also found to be advantageous. According to the invention, old oil can be employed as fuel in this way, particularly as long as the heap of scrap in the furnace prevents uncontrolled ejection of drops of metal.

According to the invention, carbonaceous fuels, mainly coal and coke, are charged into the electric arc furnace together with the scrap. According to the invention, it is however, found to be more advantageous to charge the lumps of carbonaceous energy carriers, such as coke or coal, onto the hearth of the electric arc furnace in front of the oxygen inlet nozzles.

According to the invention, however, the preferred way of adding the carbonaceous fuel is to blow it, at high speed directly into the melt and/or the scrap through one or more hollow electrodes with an abrasion-resistant coating. The top blowing of the carbonaceous fuel simultaneously favors foaming of the slag and heating at a relatively high voltage, i.e. with long and stable arcs. These relatively long arcs and the foaming of the slag reduce the radiation load on the furnace walls and thus the wear. In addition, the burning off of the hollow electrodes is about 30% less than in the case of comparable unbored electrodes that have not been prepared for supplying solids.

According to the invention, further savings of electrical energy and shortening of the charging time can be achieved by also top-blowing ground coal or oil through the top-blowing devices onto the superficially-melted scrap or the melt. Cooling of the surfaces of the scrap exposed to the stream of coal can be avoided by simultaneous blowing with oxygen or preheated air. The oxygen or the air may surround the stream of coal as it leaves the top-blowing device, or the streams of coal and gas may be arranged side by side so as to cross after a short distance. Finely divided coal, e.g. with 90% smaller than 0.5 mm, is particularly suitable for top-blowing coal on to superficially melted scrap. For top blowing coal on to the melt with free jets from the top blowing devices arranged in the upper part of the furnace, a larger particle size up to 4 mm max. is used.

According to the invention, coal, particularly coal with a high content of volatile constituents, can also be supplied through the nozzles beneath the surface of the melt bath. When this is done, it is advantageous to associate at least one oxygen nozzle with the nozzles fed with coal or coke powder, so that the melt is not locally cooled when the carbonaceous fuel is introduced. According to the invention, however, the preferred way of supplying carbonaceous fuels is through one or more hollow electrodes, since with this method of addition, the arcs increase the heat supply at the points where the coal is added.

According to the invention, further solid materials, for example slag formers such as chalk, fluorspar, etc., can advantageously be supplied to the locally superheated melt. According to the invention, materials containing iron and/or iron oxide, ores and prereduced ores of iron or alloying additions, for example manganese, chromium, nickel, vanadium, and dried sewage sludge, can be introduced into the melt in a similar manner.

It is within the scope of the invention to blow dust and problem materials into the melt, for example in order to save dumping costs. In addition, by this method, the slag or the melt is also enriched with metal values from the problem materials. It has also proved worthwhile to mix old oil with the coal stream on the way to the hollow electrode, for example directly into the inlet to the hollow electrode, and to use it to increase the heat input in the process according to the invention.

According to the invention, the addition of, for example, lump fuels with a particle size of 5 to 15 mm through a larger bore in the hollow electrode by gravity has proved to be just as good as blowing in finely divided fuel. However, supplying the pulverized fuel in suspension with a carrier gas allows bores of a significantly smaller nominal size to be used, so that the cross section of the electrode is only reduced by about 1%. For ordinary grades of steel, the carrier gas used for the fuel is chiefly nitrogen, and the supply pressure is at least 2 bar, preferably 8 to 20 bar. Other gases that can be used as carriers are noble gases, natural gas, CO, $CO_2$, air or oxygen. One $Nm^3$ of carrier gas is laden with about 10 to 30 kg of ground solid material, for example coal. The gas consumption according to the invention is small and can be further reduced if the passage of gas through the hollow electrodes during the period when no solid material is carried is largely or wholly emitted. It has been found suitable to electrically insulate the leads to the top blowing device, the hollow electrodes and the nozzles under the bath.

The process of the invention reduces the consumption of electrical energy in the electric arc furnace almost to half, and simultaneously improves the melting performance and thereby shortens the tapping cycle to about one hour. The off-gases from an electric arc furnace operating according to the process of the invention are almost completely burned and are of very little use as heating gas. The sensible heat of the off-gases can however, be used in suitable heat exchangers, for example for heating the top blowing air or for preheating scrap.

BRIEF DESCRIPTION OF THE DRAWINGS

The process of the invention will now be explained in more detail with reference to drawings and non-limiting general examples, in which.

DETAILED DESCRIPTION OF PREFERRED EMBODIMENTS OF THE INVENTION

Figure 1:
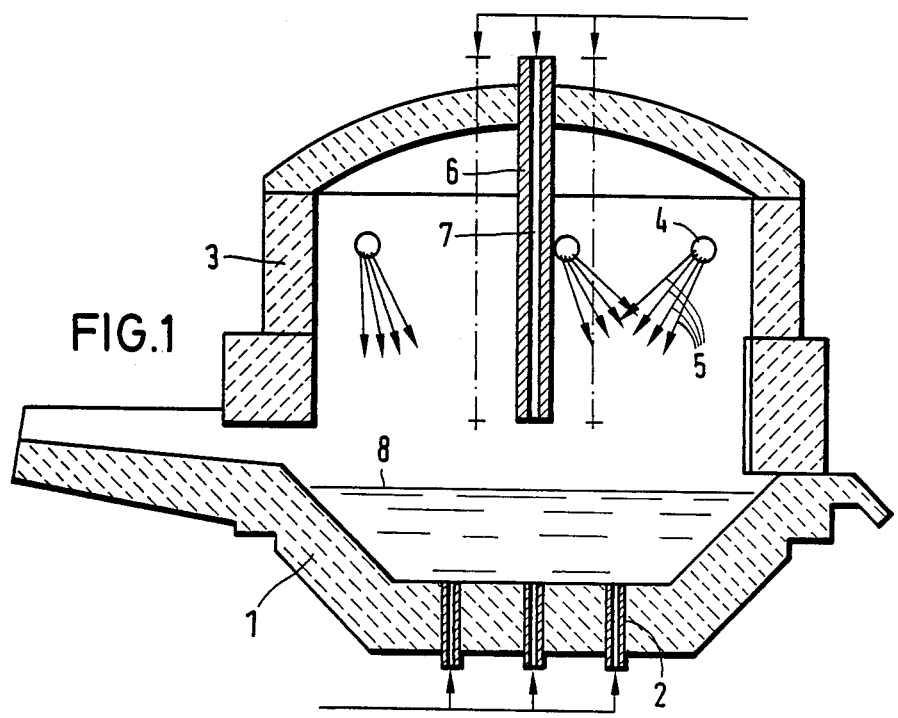
FIG. 1 shows a diagrammatic vertical section through an electric arc furnace according to the invention.

In the refractory lining 1 of the hearth, the electric arc furnace has three nozzles 2, each comprising two concentric tubes. In the upper side wall 3, there are top blowing devices 4, each with four free jets 5 that are indicated by arrows. The hollow electrode 6, with a bore 7, is also shown diagrammatically. The line 8 indicates the quiet surface of the bath before tapping.

Figure 2:
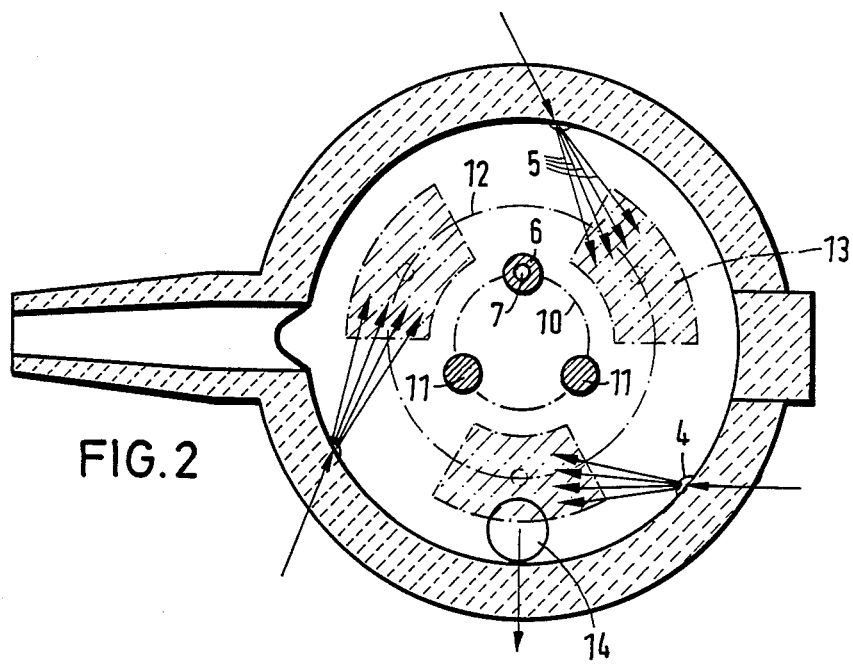
FIG. 2 represents a horizontal section through this furnace.
Figure 3:
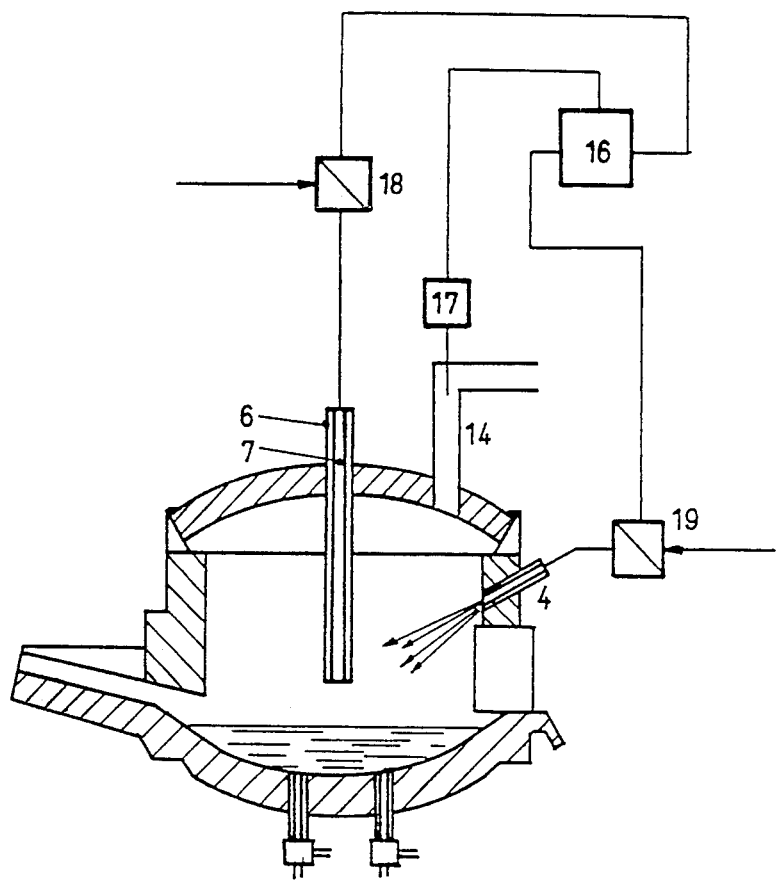
FIG. 3 shows the arrangement of FIG. 1, which includes a device for analyzing the off-gas and a device for adjusting the top blow-in devices, accordingly.
Figure 4:
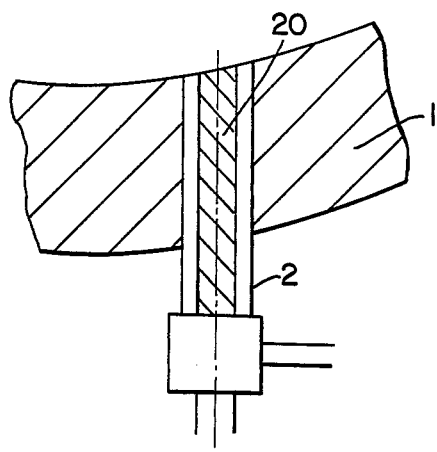
FIG. 4 shows a nozzle for introducing gases below the surface of the bath.

In FIG. 2 the electrode pitch circle 10 with the electrodes 11 thereon and the hollow electrode 6 can also be seen. The imaginary cylinder standing in the furnace chamber is indicated by the line 12, and the preferred impact surfaces 13 for the gas jets 5 are shown hatched. Finally, the off-gas opening 14 can be seen.

In a 30 t electric arc furnace of 11 MW nominal power there are three twin-tube nozzles 2 in which the inner tube is stopped up by a refractory mass, and $0.7\pm0.3$ $Nm^3$ of inert gas and propane flow through the annular gap. At the end of the blow, about 4 min. before tapping, it is changed over to argon. Built into the furnace wall 3 are three fixed top blowing devices 4, each having four free jets 5 that blow steeply downwards.

This high position avoids damage to the top blowing devices 4 by scrap. The blowing media, oxygen and coal plus nitrogen, serve, at the same time, to cool the top blowing devices. Water cooling has been found to be superfluous. In each top blowing device 4, three nozzles are operated only with oxygen, and one nozzle is used for the carbon/nitrogen suspension, with the possibility of changing over to oxygen. The coal nozzle is clad with a ceramic tube and is built into a larger oxygen nozzle of the top blowing device so that oxygen from an annular gap jackets the jet of coal. After the coal blowing, the coal nozzle is changed over at the inlet to the top blowing device with the aid of a valve to nitrogen, to flush out coal, and then to oxygen. The oxygen blowing rate when melting down scrap amounts to 9.5 $Nm^3$/min. per top blowing device.

Altogether 2.0 t of solid pig iron, 26.1 t of bought scrap and heavy scrap, 2.6 t briquettes and 1.8 t turnings are charged with three baskets in three portions. 80 kg of lump coke is placed in front of the nozzles. By means of the top blowing nozzles, 400 kg of ground anthracite and 1270 $Nm^3$ of oxygen are top blown on to the partly melted scrap and the melt. In addition, 500 $Nm^3$ oxygen are blown in with consumable lances in the area of the slag doors. The consumption of lump limestone amounts to 1100 kg. The power consumption, including a reduction phase, amounts to 10200 kWh for 30 t of molten steel at a tapping temperature of 1640° C. The electrode consumption runs at 2.7 kg/t molten steel. In 49 minutes, from switching on the current to the end of the tapping, the charge was completed.

In a variant of the process of the invention of special economic importance, 100 kg of lump coke are charged into a 30 t electric arc furnace with three twin-tube nozzles each having a nomimal size of 6 mm. The twin-tube nozzles are each fed with 0.6 to 4 $Nm^3O_2$/min and protected from premature wear by hydrocarbon or a hydrocarbon/inert gas mixture, in this case by natural gas. These nozzles are arranged at 70° to the horizontal in the planes formed between the longitudinal axes of the tangentially blowing top-blowing devices and the injection blast nozzles. The major part of the oxygen is top blown on to the scrap and the melt at the points with intensified bath movement through three top blowing devices each with three smaller and one larger nozzles. Besides the electric current, the chief energy carrier is anthracite, which is blown into the melt through a hollow electrode. Some minutes after the arcs are struck the oxygen blowing and top blowing of small amounts of coal are commenced. In each of the three melting periods, the oxygen blowing rates and the amounts of coal are increased as the heating and melting of the scrap proceed. The course of the blowing-in of coal with time is matched to the oxygen blowing rate and the off-gas analysis.

Per charge of 30 t molten steel, about 27 t of bought and heavy scrap, 3.5 t briquettes and 2.0 t turnings are used. The amount of oxygen introduced on to the scrap, on to the slag and into the furnace chamber for combustion of the reaction gases amounts to 450 $Nm^3$ through the bottom nozzles, 1600 $Nm^3$ through the top-blowing devices and 600 $Nm^3$ through the consumable lances. The consumption of anthracite amounts to 1450 kg and that of limestone 1050 kg. 300 kg of electric furnace dust with a zinc content of 24% are mixed in with the anthracite. By means of the single dust recycling, the zinc content could be enriched to 32% and a zinc recovery performed. 100 kg of coke are charged on to the bottom-blowing nozzles.

At a tapping temperature of 1630° C., the power consumption, including the reduction phase, amounts to 7200 kWh. The electrode consumption is 3.2 kg/t of molten steel. The time from commencement of charging to the end of tapping amounts to one hour. The duration of the tapping cycle can be still further reduced by operating with residual melts in the furnace or shortening the time at the end of charging by early tapping and by using ladle heaters and secondary metallurgy.

To save oxygen and increase the degree of afterburning, and for better heat transfer, the process of the invention is carried out in a 60 t UHP furnace without the use of oxygen. Preheated air at 1100° C. is blown into the scrap and on to areas of the melt where the bath movement is intensified by means of the bottom nozzles. Six twin-tube nozzles with a nominal size of 5 mm are built into the furnace floor and blown primarily with oxygen and hydrocarbon jacketing. The hot blast is introduced into the furnace chamber through six stationary top blow-in devices tangential to the imaginary cylinder with a diameter of 0.55 times the furnace diameter, while blowing downwards at about 50° to the horizontal from the upper part of the furnace wall. The over-pressure in the hot blast ring manifold at the inlets to top blow-in devices amounts to 1.2 bar. Coal is blown, as in the previous example, through a hollow electrode on to the melting scrap and the melt. In the reduction phase, coal and limestone dust are briefly blown into the melt for carburization and desulphurization to achieve the desired carbon and sulphur contents in the steel with the electrodes in a low position.

For 60 t of molten steel, the requirements are 54 t of bought and heavy scrap, 6 t of briquettes, 5 t turnings, 900 $Nm^3$ oxygen, blown in through the bottom nozzles, 12000 $Nm^3$ of hot air at 1100° C. which goes into the scrap, into the furnace chamber and on to the melt through the top blow-in devices, 800 $Nm^3$ oxygen through consumable tubes, 2400 kg coal through two hollow electrodes, 200 kg of lump coal, charged on to the hearth of the electric furnace, 2000 kg of lump limestone and 13920 kWh.

By means of accelerated addition of coal relative to the oxygen supply and the possibility of precisely setting the final carbon content of the melt and the melt temperature, it is even possible to produce crude iron from scrap and/or other iron carriers economically. The combination of crude iron production and processing of residues by blowing them in through the hollow electrodes or top blow-in devices is of great importance in particular cases. The supply of carbon carriers and oxidizing gases can be controlled so that the off-gases still contain a high proportion of CO and $H_2$ and can be supplied for other uses, such as, for example, heating or pre-reduction of metal oxides.

It is within the scope of the invention to use any desired combination of the features described and to adapt them to the operating conditions in different electric steel works.

What is claimed is:

1. A process for increased supply and saving of energy in electric arc furnaces for production of metal melts, in which, in addition to electrical energy, carbonaceous fuels and oxygen are blown into the heaped scrap and the gas space of the furnace through stationary blow-in devices in the upper region of the furnace downwards and tangentially into the space between the electrode pitch circle and the furnace wall, characterized in that process comprises blowing in the oxygen in the form of free jets, and introducing gases through nozzles arranged beneath the surface of the bath in the regions in which the free jets of oxygen imping upon the melt.

2. A process according to claim 1, further comprising blowing solids upon the melt through at least one hollow electrode.

3. A process according to claim 1 or 2, wherein blow-in devices for the oxygen have one to six apertures and the flow velocity of the oxygen free jets correspond at least to the speed of sound.

4. A process according to claim 3, further comprising analyzing the exhaust gas and adjusting the amount of oxygen flowing out of the blow-in devices in accordance with the exhaust gas analysis.

5. A process according to claim 3, further comprising adjusting the amount of oxygen flowing out of the blow-in devices in accordance with the supply of fuel.

6. A process according to claim 1, further comprising reducing the amount of gas flowing through the nozzles below the surface of the bath as the mass of the melt in the furnace when the scrap has melted increases.

7. A process according to claim 3, further comprising operating the blow-in devices, at least temporarily, with preheated air to a temperature between 700° C. and 1300° C.

8. A process according to claim 3, wherein the individual apertures in the blow-in devices have a nominal width D at a narrowest point measured in centimeters, D corresponding to the formula:

$$D = (0.3 \text{ to } 0.9)\sqrt{G/(Z \cdot n)},$$

where G is the weight of the liquid metal in tons, Z is the number of nozzles per blow-in device, and n is the number of blow-in devices.

9. A process according to claim 3, wherein the blow-in devices are arranged in the upper furnace wall such that their longitudinal axes are oriented tangentially to an imaginary standing cylinder, which has a diameter corresponding to 0.5 to 0.8 times the inside diameter of the furnace.

10. A process according to claim 9, wherein the longitudinal axes of the blow-in devices are inclined towards the bottom of the furnace at an angle to the horizontal of 30° to 60°.

11. A process according to claim 1, wherein the carbonaceous fuels are blown in with a grain size smaller than 0.4 mm onto the scrap and that the fuels are blown onto the melt with a coarser grain size up to a maximum of 4.0 mm.

12. A process according to claim 1, wherein the nozzles below the surface of the bath are operated at a pressure up to 60 bar.

13. A process according to claim 1, wherein the nozzles below the surface of the bath consist of two concentric tubes and are clad with a refractory mass when used to introduce inert gases, inert gas-carbohydrate mixtures and oil into the central tube.

14. A process according to claim 2, wherein the solids, consisting of carbonaceous fuels, dried sludge, slag-forming constituents, ores, pre-reduced ores, alloying means, residual materials, dusts or used oil, are blown with a carrier gas into the melt through at least one hollow electrode.

15. A process according to claim 14, further comprising adjusting a pressure of the solids and the carrier gas of at least 2 bar when conveying the solids through the hollow electrode.

16. A process according to claim 15, wherein the pressure of the solids and the carrier gas amounts to 8 to 20 bar.

* * * * *